Dec. 27, 1927. 1,653,904
C. S. HALL
THERMAL CIRCULATION SYSTEM FOR AIRCRAFT
Filed Jan. 11, 1926 2 Sheets-Sheet 1
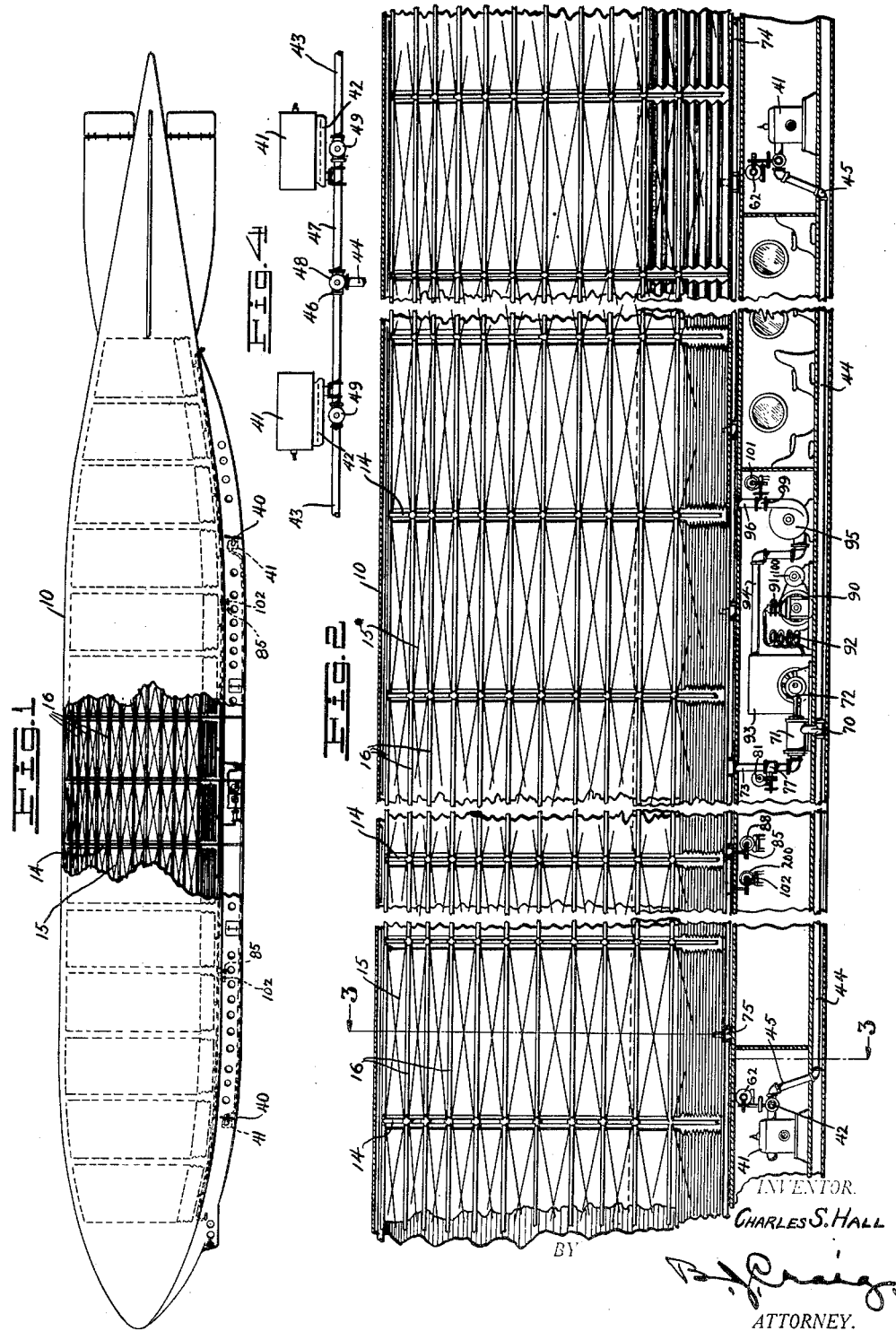
INVENTOR.
Charles S. Hall
BY
ATTORNEY.

Dec. 27, 1927.
C. S. HALL
1,653,904
THERMAL CIRCULATION SYSTEM FOR AIRCRAFT
Filed Jan. 11, 1926
2 Sheets-Sheet 2
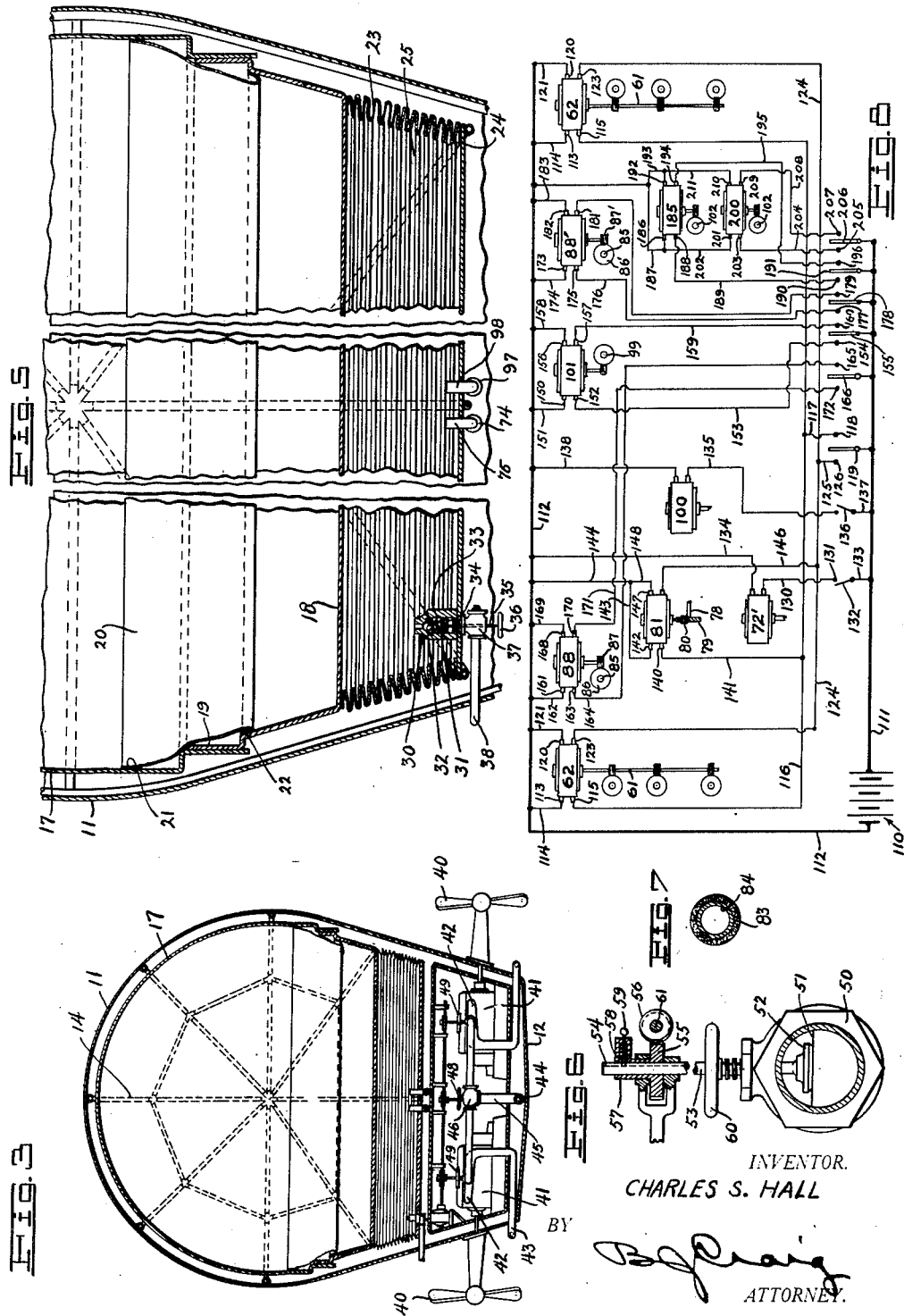
INVENTOR.
CHARLES S. HALL
BY
ATTORNEY.

Patented Dec. 27, 1927.

1,653,904

UNITED STATES PATENT OFFICE.

CHARLES S. HALL, OF OAKLAND, CALIFORNIA, ASSIGNOR TO HALL AIRWAYS CORPORATION, OF DOVER, DELAWARE, A CORPORATION.

THERMAL CIRCULATION SYSTEM FOR AIRCRAFT.

Application filed January 11, 1926. Serial No. 80,442.

This invention relates to thermal circulation systems for aircraft.

In the flying of lighter-than-air aircraft it is frequently desirable that some means be provided for quickly changing the temperature of the lifting gas and the general object of my invention is, therefore, to provide means whereby such temperature changes can be efficiently and quickly effected.

A specific object of the invention is to provide an aircraft having main gas holding compartments and auxiliary air holding compartments and wherein novel means is provided for changing the temperature of the air in the air holding compartments.

Another object of the invention is to provide means whereby the heat developed in the propelling engine of an aircraft may be utilized to change the temperature of the lifting gas.

A further object of the invention is to provide means for cooling the lifting gas of an aircraft.

Other objects of the invention will be apparent from the following description taken in connection with the accompanying drawings, wherein:

Fig. 1 is a side elevation of an aircraft embodying the features of my invention;

Fig. 2 is a fragmentary central sectional view of an aircraft showing details of my invention;

Fig. 3 is a section on line 3—3, Fig. 2;

Fig. 4 is an elevation showing valve means;

Fig. 5 is a fragmentary view similar to Fig. 3 on an enlarged scale;

Fig. 6 is an enlarged detail partly in section showing one of the valve control mechanisms;

Fig. 7 is a central view showing the heated insulated pipe, and

Fig. 8 is a wiring diagram.

Referring to the drawing by reference characters, I have shown an aircraft embodying the features of my invention at 10. This aircraft may be of any desired external configuration, although I prefer to provide an elongated body which has a curved upper surface 11 and a relatively flat lower surface 12.

The body is shown as divided by a plurality of transversely extending frame members 14 into sections or compartments 15. The body is also provided with suitable longitudinal framing or bracing 16 so that a rigid structure is provided. It will be understood, however, that my invention is not limited in its application to aircraft of the rigid type, but can be applied to other types of aircraft.

The aircraft preferably includes a plurality of inner gas-tight bodies 17 which may be made of suitable light weight metal or other material which are held adjacent to the outer body 11. These inner bodies 17 are adapted to contain the lifting gases. The lower part of each body 17 is open and is closed by a movable closure member 18 which has a flange 19 thereon. The flanges 19 fit within the lower part of the bodies 17 as will be seen in the drawing. These flanges are adapted to move within the bodies with the adjacent surfaces in engagement. In order to provide a gas-tight joint between the bodies I secure an impervious gas-tight flexible fabric strip or other member 20 at 21 to all sides of each of the bodies 17 and secure it at 22 to all sides of the flanges 19. With this arrangement the closures 18 may move with respect to the body parts 20 to change the capacity of the compartments without causing leakage of the lifting gas.

Secured to the body of the closure member 18, I show a bellows like strip of flexible material 23. This strip may be metal or fabric and extends entirely about the lower edge of the closure 18 and is secured to the edges of a plate 24 so that the member 23 in conjunction with the plate 24 provides a compartment 25. As the gas in the main gas compartment 20 expands it will move the closure member 18 downwardly thereby compressing the air in the air holding compartment 25.

In order to allow escape of this air when a certain pressure is reached, I provide a valve 30 which is secured to the plate 24. This valve includes an apertured member 31 which may be closed by a ball 32 which is normally urged to its seat by a spring 33. The spring 33 engages a disc 34 which is adjustably engaged by a stem 35 having a hand wheel 36 thereon. The stem 35 passes through a coupling 37 which is shown as threaded to the plate member 24. The stem 35 is in threaded engagement with coupling 37 so that this stem may be turned and adjusted, thereby adjusting the pressure of the spring on the ball valve 32 so that the pressure at which the air in the air compartment 25 may be discharged, may be adjusted. A pipe 38 extends from the coupling 37 so that the surplus air may pass to the atmosphere.

In order to provide means for driving the aircraft I support upon the body thereof propellers 40 which are adapted to be driven by internal combustion engines 41. These internal combustion engines 41 are preferably arranged in pairs on opposite sides of the air craft, preferably with one pair forward and one pair aft, although the specific arrangement of the propellers and their specific construction forms no part of the present invention.

Each of the engines 41 is shown as provided with an exhaust manifold 42 to which is secured an exhaust pipe 43. Extending longitudinally of the air craft I show a pipe 44 which is connected by pipes 45 with couplings 46, which are connected by pipes 47 with the exhaust manifold of each engine 41. A valve 48 is provided in each coupling 46 to control passage of the gases to the pipe 45. A valve 49 is arranged in each pipe 43 and the construction is such that the exhaust from the engine may be turned into the exhaust pipes 43 by opening the valves 49 and closing the valves 48 and may be turned into the pipe 44 by closing the valves 49 and opening the valves 48.

Each of the valves 48 and 49 may be of the type shown in Fig. 6 wherein the body 50 is provided with a valve seat 51 on which a valve 52 is arranged to seat to close the passageway. The valve is provided with a stem 53 which is slotted as at 54. Mounted upon the stem 53 is a worm 55 which engages a worm wheel 56 which may be driven by a suitable motor to be presently described. The worm 55 is provided with a hub 57 thereon which is provided with a spring pressed locking dog 58 which has an operating handle 59 thereon. The construction is such that when the handle 59 is free the dog will engage in the slot 54 so that the worm 53 will be turned when the worm wheel 56 turns. The stem 53 has a hand wheel 60 thereon which is keyed thereto and when it is desired to turn the valve by means of the hand wheel independently of the motor the member 59 may be pulled thereby moving the dog 58 from the slot 54, so that the stem may turn freely and may be turned by the hand wheel after which the member 59 may be released and the power operation may be resumed.

The worm wheels 56 for controlling the valves 48 and 49 at each end of the aircraft are all on a shaft 61 which is connected to the armature shaft of a light weight, high speed, reversible motor 62. The worms and worm wheels for the valves 49 have a pitch opposite to the pitch of the worms and worm wheels which operate the valve 48. As a consequence when the motor 62 is operated in one direction the valves 49 will be opened while the valves 48 are being closed and when the motor is reversed the valves 48 will be opened and the valves 49 closed. It will thus be apparent that operation of the motor will cause the exhaust valves to pass through pipes 43 to the atmosphere or to the pipe 44.

The pipe 44 is shown as connected by means of a coupling 70 with the cylinder 71 of an air compressing device 72. This air compressing device 72 may be driven by a motor 72'. The compressor is connected by means of a pipe 73 with a pipe 74 which extends longitudinally of the aircraft. This pipe 74 is provided with connections 75 which have pipes 76 thereon which enter the compartments 25. A valve 77 is arranged on the pipe 73 to control this pipe. This valve 77 has a stem 78 which has a worm 79 thereon. The worm 79 is driven by a worm gear 80 on the armature shaft of a motor 81.

It may be here mentioned that all of the pipes which I describe herein may be of light weight material and may be provided with suitable heat insulation. In Fig. 7, this heat insulating material which is shown at 83 on a pipe 84, may be asbestos or coating of some material which is a poor conductor of heat.

Valves 85 are shown as inserted in the pipe 74 intermediate the length thereof to direct all of the hot gases to the compartments in one portion of the aircraft if desired. These valves 85 are each motor driven. The forward valve has a gear 86 thereon which is driven by a gear 87 on a motor 88 while the aft valve 85 has a gear 86' driven by a gear 87' on a motor 88'.

Arranged in the bottom of the aircraft and preferably adjacent to the air compressor 71 I show an air cooling device 90. This device may be of any desired nature and may comprise a compressor 91, a coil 92 and a cooling chamber 93. Atmospheric air is adapted to enter the cooling chamber 93 where it may be cooled and will pass to a pipe 94 whence it moves to a blower 95 which is connected by means of a fitting 96 with a pipe 97 arranged parallel to the pipe 74. This pipe 97 like the pipe 74 has a pipe 98 which enters each of the compartments 25 so that cool air may be provided for these compartments. The flow of cold air to the pipe 97 is shown as controlled by a valve 99. The blower 95 may be driven by a motor 100 while the valve 99 may be controlled by a motor 101.

The pipe 97 is provided with valves 102 intermediate the ends thereof. These valves 102 are spaced apart so that cold air may be sent to one portion of the aircraft to cool the lifting gas without sending the cold air to the other parts of the aircraft.

The location of the valves 85 and 102 may be arranged so that while a portion of the compartments are being warmed the remainder of the compartments may be cooled. In this way the buoyant effect of various parts of the aircraft may be altered to suit the requirements of maneuvering.

In order to control the various motors mentioned I may provide a source of electric current 110 as shown in Fig. 8. From this source leads 111 and 112 extend. The lead 112 is connected to the terminals 113 of the motors 62 by leads 114, while the companion terminals 115 of the motors 62 are connected to a lead 116 which is connected by means of a lead 117 with a terminal 118 and with a switch 119. When the switch 119 is moved to the right in Fig. 8 it will close the circuit and will cause the motors to operate to shift the valves 48 and 49. The terminals 120 on the motors 62 are connected by leads 121 to the lead 112 while the terminals 123 are connected to a lead 124 which is connected by means of a lead 125 with a terminal 126 of the switch 119. When the switch 119 is moved to the left in Fig. 8 the motor will be reversed so that the movement of the valves will be reversed. It will thus be apparent that by shifting the switch 119 the motors may be reversed, while when the switch is left in the neutral position the motors 62 will be inactive.

In order to operate the air compressor motor 72′ I connect one terminal of this motor by means of a lead 130 to a terminal 131 of a switch 132 which is connected by a lead 133 with the lead 111 while the other terminal of the motor 72′ is connected by a lead 134 with the lead 112 previously mentioned. The motor 72′ may be operated by closing the switch 132. In a similar manner, the motor 100 which controls the blower is connected by means of a lead 135 with a switch 136 which is in turn connected by a lead 137 with the lead 111. The other terminal of the motor 100 is connected by a lead 138 with the lead 112 previously mentioned. It will thus be seen that operation of the switch 136 will actuate the blower motor 100.

The motor 81 which controls the valve 77 is a reversible motor. The terminal 140 of this motor is connected by a lead 141 with the lead 116 while the terminal 142 is connected by a lead 143 with a lead 144 which is connected with the lead 112. It will thus be seen that when the switch 119, previously mentioned, is moved to the left in Fig. 8, it will cause the motor to operate, so that as the valves 48 are opened and the valves 49 are closed the valve 77 will open. The terminal 145 of the motor 81 is connected by a lead 146 with the lead 124 while the terminal 147 is connected by a lead 148 with the lead 112 so that when the switch 119 is moved to the left in Fig. 8, it will cause the motor 81 to reverse. As a result when the switch 119 is moved to the left the valves 48 will be closed, the valves 49 will be opened, and the valve 47 will be closed.

The valve 99 is controlled by the motor 101, as stated. This motor is reversible and has one terminal 150 connected by a lead 151 with the lead 112, previously described. The terminal 152 of the motor is connected by a lead 153 by a terminal 154 with a switch 155, which is connected with the lead 111, so that when the switch is moved to the left in Fig. 8 the motor will operate in one direction. The terminals 156 and 157 of the motor 101 are connected by leads 158 and 159 with the lead 112 and with the terminal 160 respectively so that when the switch 155 is moved to the right in Fig. 8, the motor will be reversed.

In order to operate the front valve 85 by the motor 88 one terminal 161 thereof is connected by lead 162 to the lead 112, while another terminal 163 is connected by a lead 164 to the terminal 165 of a switch 166. Movement of the switch 166 to the right in Fig. 8 will cause the motor to operate in one direction. The terminal 168 of the motor is connected by a lead 169 with the lead 112 while the terminal 170 of the motor is connected by a lead 171 with the terminal 172 of the switch 166 so that when the switch 166 is moved to the left in Fig. 8 the motor 88 will be reversed.

The motor 88′ for controlling the aft valve 85 has a terminal 173 connected by a lead 174 with the lead 112. This motor also has a terminal 175 connected by a lead 176 with a terminal 177 of a switch 178. The other terminal 179 of the switch is connected by a lead 180 with a terminal 181 of the motor while the companion terminal 182 is connected by a lead 183 with the lead 112.

It will thus be apparent that when the switch 178 is moved to the right and left it will cause reverse operation of the motor 88′. It may be here stated that all of the switches which reverse the motors have a neutral intermediate point so that the motors can be stopped.

The valves 102 are motor operated. The forward valve 102 is moved through suitable gearing by a motor 185, one terminal 186 of which is connected by a lead 187 with the lead 112 while the companion terminal 188 is connected by a lead 189 to a terminal 190 of a switch 191. The terminal 192 of this motor is connected by a lead 193 with the lead 112 while the companion terminal 194 is connected by a lead 195 to a terminal 196 of the switch 191. Movement of the switch 191 serves to reverse the motor 185.

The motor 200 which controls the aft valve 102 has a terminal 201 connected by a lead 202 with the lead 112 and a terminal 203 connected by a lead 204 to a terminal 205 of a switch 206, the other terminal 207 of which is connected by a lead 208 with a terminal 209 of the motor. The other terminal 210 is connected by a lead 211 with the lead 112 previously described. It will thus be apparent that movement of the switch 206 will cause reverse operation of the motor 200.

From the foregoing description it will be apparent that I have provided novel means for warming and cooling the lifting gas of aircraft and that I have provided novel means for controlling the warming and cooling means.

Having thus described my invention, I claim:

1. In an aircraft, a body having a compartment therein, said compartment having an opening in the bottom thereof and a closure member slidably mounted in said opening to vary the capacity of said compartment, said member having an elongated flange fitting said opening.

2. In an aircraft, a body having a compartment therein, said compartment having an opening in the bottom thereof and a member slidably mounted in said opening to vary the capacity of said compartment, a collapsible diaphragm on said sliding member, a closure for said diaphragm to form a compartment, an internal combustion engine for operating said aircraft, said internal combustion engine having an exhaust pipe thereon and means to lead the gases from said exhaust pipe to said diaphragm compartment.

3. In an aircraft, a body having a compartment therein, said compartment having an opening in the bottom thereof and a member slidably mounted in said opening to vary the capacity of said compartment, a second compartment associated with said first mentioned compartment, an internal combustion engine for operating said aircraft, said internal combustion engine having an exhaust pipe thereon and means to lead the gases from said exhaust pipe to said second compartment, an air cooling device on said aircraft, and means to conduct cool air from said device to said compartment.

4. In an aircraft, an elongated body having a plurality of compartments therein, said compartments being disposed along the body, each of said compartments including means for holding lifting gas therein, means to heat said compartment and means whereby the heating means can be cut off from certain of said compartments while it remains active for other compartments, and means to reduce the temperature of said certain compartments below the temperature of the atmosphere in which the aircraft is located.

5. An aircraft, a body having a compartment therein, said compartment having a movable closure thereon, an auxiliary compartment associated with said compartment, said closure serving as one wall of said auxiliary compartment, means to admit warm air to said compartment, means to furnish warm air to said means, means to admit cool air to said compartment, means to furnish cool air to said cool air means, and an automatic valve in said auxiliary compartment, said valve being operable when the pressure in the compartment reaches a certain point.

6. An aircraft comprising an elongated body having a gas holding container therein, means to drive the aircraft, heat producing means on said aircraft, said heat producing means including a part of said driving means, air cooling means on said aircraft, means to operate said air cooling means, and other means whereby said first two mentioned means may act selectively to change the temperature of the gas in the container.

7. In an aircraft, a body having a compartment therein, said compartment having an opening in the bottom thereof and a closure member slidably mounted in said opening to vary the capacity of said compartment, a collapsible diaphragm on said sliding member, a closure for said diaphragm to form a compartment.

In testimony whereof, I hereunto affix my signature.

CHARLES S. HALL.